United States Patent [19]

Bradley et al.

[11] 4,084,657

[45] Apr. 18, 1978

[54] METHOD AND APPARATUS FOR PREVENTING THEFT OF IDLING VEHICLES

[76] Inventors: W. L. Bradley, 64 Ford St., Ansonia, Conn. 06401; Bennie W. Frye, 70 Evelyn St., Stratford, Conn. 06497; Joseph W. Raines, 686 Platt St., Bridgeport, Conn. 06606

[21] Appl. No.: 446,772

[22] Filed: Feb. 28, 1974

Related U.S. Application Data

[63] Continuation-in-part of Ser. No. 166,067, Jul. 26, 1971, abandoned.

[51] Int. Cl.² .............................................. B60R 25/04
[52] U.S. Cl. .................................... 180/114; 70/242; 123/198 B; 137/384.2; 251/183
[58] Field of Search ................. 180/114; 123/198 B, 123/198 DB; 137/384.2; 70/242; 251/183 X, 205, 206, 207, 117, 209

[56] References Cited

U.S. PATENT DOCUMENTS

| | | | |
|---|---|---|---|
| 1,426,308 | 8/1922 | Maloney | 70/242 |
| 1,638,152 | 8/1927 | Gabriel | 251/183 X |
| 2,129,575 | 9/1938 | Gilman | 70/242 X |
| 2,881,789 | 4/1959 | Finazzo | 137/384.2 X |
| 3,386,461 | 6/1968 | Fisher | 251/207 X |

*Primary Examiner*—Kenneth H. Betts
*Attorney, Agent, or Firm*—Mattern, Ware, Davis & Stoltz

[57] ABSTRACT

A valve positioned in the fuel supply line of a vehicle has two positions selectable by means of a key-operated lock. In the first position, the valve permits full fuel flow allowing the vehicle to operate in its normal manner. In the second position, the valve only permits a greatly reduced fuel flow allowing the vehicle to operate at idle speed, and thereby preventing the vehicle from being operated in its normal manner by an unauthorized user.

9 Claims, 6 Drawing Figures

METHOD AND APPARATUS FOR PREVENTING THEFT OF IDLING VEHICLES

This application is a continuation-in-part of our previous application, Ser. No. 166,067, filed July 26, 1971, now abandoned. su

SUMMARY OF THE INVENTION

This invention relates to a method and apparatus for preventing the theft of motor vehicles, and it relates more particularly to a method and apparatus which permits a vehicle to be left unattended with its engine idling and yet prevents the vehicle from being driven away by an unauthorized user.

BACKGROUND OF THE INVENTION

Theft of motor vehicles has become a major problem. Current devices for preventing theft are generally either ineffective, or are not practical for other reasons, such as expense or difficulty of operation.

Prior art devices have also been of an "all-or-nothing" character. That is, their object was to either allow the vehicle to be driven in its normal manner or to prevent operation of the vehicle altogether. However, there are many situations wherein it is desirable to permit vehicles to idle unattended while preventing their unauthorized removal and use. Such vehicles may include delivery trucks, taxi cabs, and mail collection trucks wherein the driver may wish to leave the vehicle unattended for short periods of time, and may further wish to leave the vehicle idling. It may also be desirable to leave unattended emergency equipment idling in order to run accessories, such as flashing lights, pumps, and the like. Vehicles equipped with diesel engines, or other engines of a type difficult to start, would also benefit from a device permitting the engine to run at a slow speed and at the same time preventing the theft of the vehicle. The common motorist may find such a device useful in warming up his car on a cold morning, or when leaving his car in a parking lot wherein the ignition key must be left with the car for moving it about the lot. Many other situations also exist wherein it would be desirable to leave the engine of a vehicle running, and yet to prevent its theft.

It is well known to stop theft of vehicles by including key controlled terminals in the electrical system. However, it is equally well known to "jump" or "hot wire" the electrical system, thereby avoiding the key controlled terminals and permitting unauthorized use of the vehicle. Further, these devices do not have the capability of allowing the vehicle to idle while preventing theft thereof.

Similarly, there are devices which include a key controlled valve for blocking the supply of fuel to the engine of the vehicle, thus preventing operation thereof. Such devices include one shown in U.S. Pat. No. 1,331,120 to Naylor which comprises a key and lock actuated plate for totally blocking the passage between the carburetor and the intake manifold of an engine. Naylor's device includes a spring 30 urging a locking dog 28 into either notch 26 or 27 in a rotary member 25 which controls the position of the blocking plate 18, said locking dog 28 and notches 26 and 27 holding the plate in either an entirely closed or completely open position.

In U.S. Pat. No. 1,394,860 to Neville there is disclosed a gasoline flow line lock which includes a plug valve 8 disposed in the fuel line of a vehicle. The plug valve 8 has a transverse bore formed therethrough, and the plug valve is opened by aligning the bore with the fuel line to provide a through-passage. The fuel line is totally blocked by rotating the plug valve to avoid such a through-passage. A lever 12 for rotating a cam 10 connected to the plug valve is provided for closing the plug valve, and a key operated lock is utilized for opening it. A similar device having a key and lock operated plug valve with a transverse bore therethrough alignable in a fuel line to provide a through-passage for the flow of fuel and further rotatable to totally block such flow of fuel is shown in U.S. Pat. No. 2,881,789 to Finazzo.

Other devices for preventing the theft of vehicles by totally blocking the fuel supply to the engines thereof are shown in U.S. Pat. No. 1,413,042 to Lyons and U.S. Pat. No. 2,906,284 to Lau. Lyons' device includes a needle valve spring biased to a closed position against a valve seat to totally block the flow of fuel from a fuel supply tank. The needle valve may be opened by rotating a key and lock actuated shaft having a cam secured thereon to lift the needle valve against the spring bias from its seat and permit the flow of fuel. Lau's device also includes a valve 19A spring biased to block an orifice 20 in the fuel supply line of the vehicle. Key and lock controlled means are used to push the valve 19A away from the intake orifice 20 to permit a full flow of fuel.

A still further device for blocking the flow of fuel to an engine is found in U.S. Pat. No. 3,354,980 to Nielsen. Nielsen provides a gravitationally operated check valve of the ball and seat type disposed in the fuel line, said ball movable upward to permit free flow of fuel by means of actuating a solenoid disposed about the check valve. Yet another means of controlling the flow of fuel to an engine is shown in U.S. Pat. No. 2,904,121 to Honeyman. This device includes a key operated vent opening into the fuel line on the supply side of a vacuum type fuel pump wherein opening of the vent disrupts the vacuumatic action of the fuel pump and stops fuel flow to the engine.

All of the above described prior art devices have only two operating modes. They either permit a sufficient supply of fuel for the vehicle to be operated in its normal manner, or they completely block the supply of fuel, preventing the vehicle from being operated at all. They therefore do not meet the need for an anti-theft device which permits a motor vehicle to be idled, and yet prevents the vehicle from being driven away by an unauthorized user.

GENERAL DESCRIPTION

The method and apparatus of the present invention effectively prevent the theft of vehicles, and yet permit an unattended vehicle to be left idling without fear of unauthorized use.

This is accomplished by restricting the operating speed of the vehicle's engine. The preferred method comprises greatly restricting the flow of fuel from a fuel supply to a vehicle engine, the restricted fuel flow being sufficient to permit the engine to idle. The restricted flow is insufficient to permit the vehicle to be driven away in a normal manner. A two position, key actuated valve positioned in the fuel line between the fuel supply and the engine is provided for this purpose. The valve has a first position permitting the free flow of fuel from the fuel supply thereby allowing the engine to run in its normal and usual fashion. A second position of the valve greatly restricts the fuel flow in order to permit only very low speed operation of the engine. In the event an unauthorized user attempts to drive the vehicle, it will stall after being run for only one tenth of a mile before using the amount of fuel stored in the carburetor's float chamber, and the restricted fuel flow permitted by the valve is insufficient to permit the vehicle to be restarted.

OBJECTS OF THE INVENTION

It is a principal object of the invention to prevent the theft or unauthorized use of motor vehicles.

It is a second object of this invention to prevent the theft or unauthorized use of motor vehicles while permitting the vehicles to idle.

It is an additional object of the invention to greatly reduce the supply of fuel available to the engine of a vehicle, permitting it to idle but not to run in its normal manner.

It is another object of the invention to provide a tamper-proof anti-theft device for vehicles.

It is a still further object of the invention to provide an anti-theft device for vehicles which is constructed of durable, maintenance free parts.

It is yet another object of the invention to provide an anti-theft device for vehicles which is inexpensive and easily installed on existing vehicles.

Other objects of the invention will in part be obvious and will in part appear hereinafter.

The invention accordingly comprises the several steps and the relation of one or more of such steps with respect to each of the others, and the appartus embodying features of construction, combination of elements and arrangement of parts which are adapted to effect such steps, all as exemplified in the following detailed disclosure, and the scope of the invention will be indicated in the claims.

THE DRAWINGS

For a fuller understanding of the nature and objects of the invention, reference should be had to the following detailed description taken in connection with the accompanying drawings in which.

The same reference characters refer to the same elements throughout the two views of the drawings.

DETAILED DESCRIPTION

Figure 1:
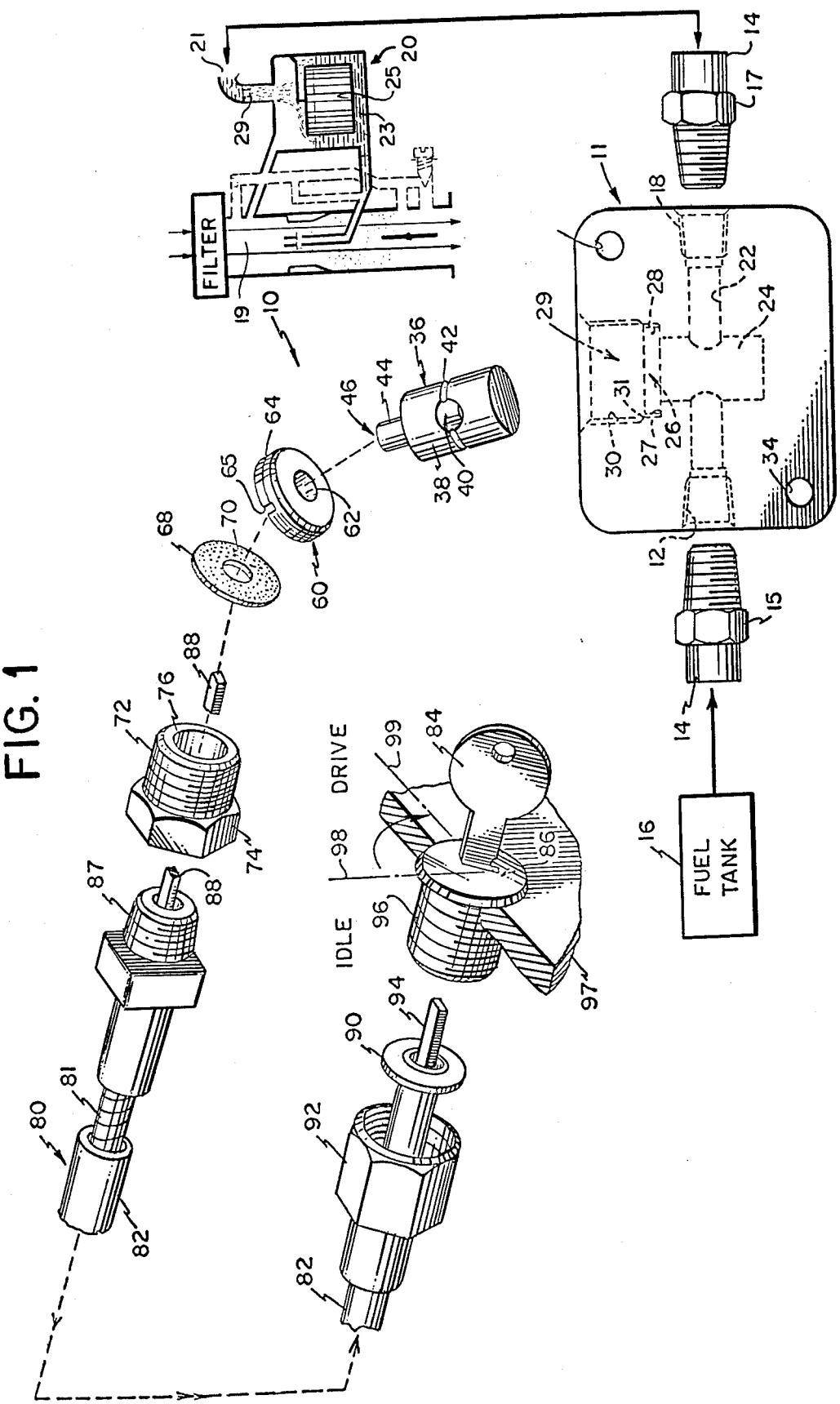
FIG. 1 is an exploded perspective view of an anti-theft device according to the invention.

An anti-theft device 10 according to the invention is shown in the exploded perspective view of FIG. 1. It generally comprises a two-position valve 36 which controls the flow of fuel through a housing 11 disposed in a fuel line 14 leading to a carburetor 20 of an engine. In a first position of the valve, a full flow of fuel is permitted by a transverse bore 40 through the valve. In a second position, a restricted flow of fuel passes through a groove 42 in the valve, this flow being sufficient to permit the engine to idle. The valve's position is controlled by a cable assembly connected to a lock and key, which may be conveniently located.

As is well known in the art, typical carburetor 20 incorporates a fuel chamber 23 and a float 25 which controls the amount of fuel in chamber 23. When required by the engine, fuel from chamber is injected into airstream 19, providing the system with the proper air-fuel mixture. As fuel is removed from chamber 23 into the airstream, float 25 drops downwardly, causing valve assembly 29 to open and allow fuel to be admitted into chamber 23 until float 25 reaches its desired level and closes valve assembly 29.

By employing the lockable restricting valve of this invention, only sufficient fuel to allow the engine to idle is supplied to inlet port 21 of carburetor 20. Consequently, if a potential thief were to attempt to steal this vehicle, he would only be able to get as far as the fuel in chamber 23 would allow. When the fuel in chamber 23 is being used in a "get-away", valve assembly 29 opens to allow more fuel into the chamber. However, only a sufficient fuel quantity for idling is being supplied to inlet port 21. As a result, chamber 23 will become quickly depleted of fuel, and the engine will stall and will not start. The end result is the successful prevention of the theft of the vehicle.

Nevertheless, the present invention, by its placement between the fuel tank 16 and the carburetor 20 allows the engine to continue to idle even during minor transient surge loadings; such as, when a compressor of an air conditioning unit is thermostatically activated. At such times, the reservoir of fuel in chamber 23 provides the additional fuel needed to idle the engine under the surge load; and since the steady-state loading of the accessory following its initial surge loading is met by the engine operating in response to fuel received at the idle flow rate of the anti-theft device 10, the engine will not stall.

The anti-theft device of FIG. 1 includes a housing 11 having a threaded inlet 12 receiving an end nut connector 15 attached to a fuel line 14 leading from a fuel tank 16. A threaded outlet 18 from the housing 11 is connected to the remaining portion of the fuel line 14 by means of end nut connector 17, the fuel line thereafter leading to carburetor 20 of an automobile, truck, boat, or other form of motor vehicle.

The housing 11 includes a passage 22 formed therethrough and communicating at its ends with the inlet 12 and outlet 18. Intersecting the passage 22 is a bore comprising a cylindrical valve chamber 24 formed in the housing 11 with its axis perpendicular to the axis of passage 22.

Coaxial with the valve chamber 24 is a second, larger diameter bore 26, wherein a shoulder 27 is formed peripherally surrounding the top opening of valve chamber 24. The bore 26 is threaded, as indicated at 28. A third bore 29 of further increased diameter is also formed in the housing 11 coaxial with bore 26 and valve chamber 24. Bore 29 is also threaded, as indicated at 30, and has a shoulder portion 31 separating it from bore 26.

The housing 11 is further provided with two openings 33 and 34 accommodating mounting bolts for securing the housing to a vehicle. The housing 11 is preferably constructed of a sturdy, non-corrosive metal. It may also be constructed of nylon, or any other rugged, non-corrosive material consistent with providing a tamper-proof, trouble free device.

Figure 3:
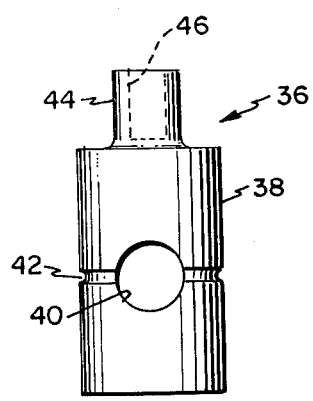
FIG. 3 is a side elevational view of a valve comprising a portion of the anti-theft device of FIG. 1.
Figure 4:
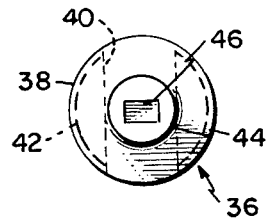
FIG. 4 is a top plan view of the valve of FIG. 3.

A valve 36, shown in perspective in FIG. 1 and shown in detail in FIGS. 3 and 4 controls the flow of fuel from fuel tank 16 through line 14 and passage 22 to the engine 20. The valve 36 has a cylindrical base portion 38 rotatably receivable in valve chamber 24. A transverse bore 40 is formed through valve 36, the bore being of approximately the same diameter as passage 22 through housing 11. The bore 40 is positioned in valve 36 so that the bore is aligned with the passage 22 by appropriate rotation of the valve 36 in its valve chamber 24 to provide a full and normal flow of fuel through housing 11.

Peripherally surrounding the valve 36 at the same height as transverse bore 40 is a groove 42. When the valve 36 is rotated to a position wherein the bore 40 is not aligned with the passage 22, a restricted flow of fuel through housing 11 is provided through the peripheral groove 42. The size of the groove 42 is chosen to permit a flow of fuel sufficient for the engine 20 to idle.

In the preferred embodiment of the invention, the anti-theft device was adapted for installation on an automobile having a 283 cubic inch displacement engine. This engine idled satisfactorily on the gasoline provided through a peripheral groove having a semi-circular cross section with a radius of 0.0125 inches. It will be readily understood that a larger engine may require a slightly larger groove to idle properly, and vice versa for a smaller engine.

The valve 36 further comprises a stem 44 protruding upwardly from the base portion 38. A slot opening 46 best seen in FIGS. 3 and 4, is provided in the top of stem 44 for receiving drive means for rotating the valve.

Figure 5:
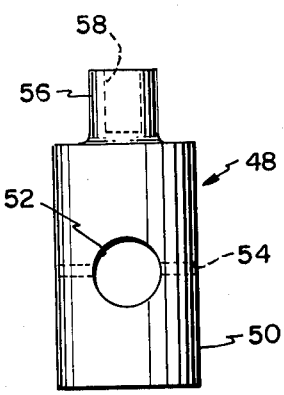
FIG. 5, is a side elevation view of an alternative embodiment of a valve suitable for use in the anti-theft device of FIG. 1.
Figure 6:
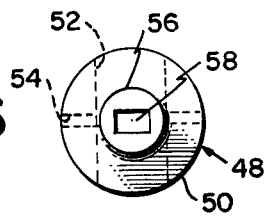
FIG. 6 is a top plan view of the valve of FIG. 5.

An alternative valve 48 for use in the anti-theft device 10 is shown in FIGS. 5 and 6. Valve 48 also has a cylindrical body portion 50 rotatably receivable in valve chamber 24 of housing 11 and a transverse bore 52 formed therethrough provides full fuel flow when aligned with passage 22. Valve 48 further comprises a second transverse bore 54 having a diameter small in comparison to bore 52. When valve 50 is rotated to align bore 54 in passage 22, bore 54 provides a reduced fuel flow in a similar manner as the peripheral groove 42 of valve 36. In order to permit a 283 cubic inch displacement engine to idle satisfactorily, the diameter of bore 54 was selected as 0.025 inches. Valve 48 is also provided with a stem 56 having a slot opening 58 in the top thereof to receive means for rotating the valve.

Valve 36 or valve 48 may be fabricated of a non-corrosive metal, nylon, or other non-corrosive material which is durable and will not contaminate the fuel.

Figure 2:
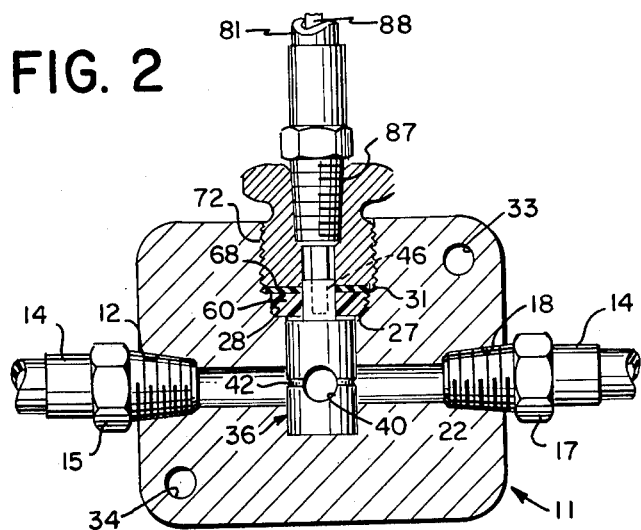
FIG. 2 is a side view partially in cross section of the anti-theft device in FIG. 1.

Referring now to FIGS. 1 and 2, valve 36 is rotatably positioned in valve chamber 24 of housing 11. A sealing nut 60 is provided with a central opening 62 for accommodating the valve stem 44. The peripheral portion 64 of sealing nut 60 is threaded, and it is partially slotted at 65 to receive a two prong key. The sealing nut 60 is turned into bore 26 in housing 11 until it seats against shoulder 27, thereby securing valve 36 in position and acting as a bushing to permit free rotation of the valve.

A gasket 68 having a central opening 70 for accommodating valve stem 44 is provided for sealing the valve chamber 24 against leakage of fuel. Gasket 68 has approximately the same diameter as bore 29, and its flat side thereby seats against the top of sealing nut 60 and shoulder 31 between bore 29 and bore 26 to prevent leakage past threads 28.

A threaded bolt 72 having a hexagonal head 74 is turned into bore 29 until its end butts against seal 68. A central bore 76 is formed through the threaded bolt 72 to permit access to the slot opening 46 on the top of valve stem 44, which may protrude partially into the central bore thereby utilizing the bore as a bushing.

In the preferred embodiment of the invention, the means for rotating the valve 36 in its chamber 24 comprises a coaxial cable 80 the inner portion 81 of which is rotatable by means of key 84 and lock 86. The outer casing 82 of the cable 80 terminates at one end at a threaded connector 87, and the interior of bore 76 in bolt 72 is threaded in its upper portion to accept the threaded connector 87. The inner rotatable portion 81 of coaxial cable 80 terminates in a rectangular tongue 88, and tongue 88 is received in slot 46 in valve stem 44 to engage the valve 36 with the cable 80. The opposite end of cable casing 82 terminates in a flange portion 90 and an associated cap nut 92. The inner portion 81 of cable 80 terminates in a rectangular portion 94 engagingly receivable in the lock 86. The outer portion of the lock 86 may be threaded as indicated at 96 to receive the cap nut 92. The lock is shown installed through the instrument panel 97 of a vehicle in which the anti-theft device is installed. The cable 80 and the housing 11 are preferably installed in a shielded position in the vehicle to prevent tampering with the anti-theft device.

The lock 86 has two positions. The first position, designated as the "idle" position by line 98 in FIG. 1, causes valve 36 to be positioned in valve chamber 24 with its transverse bore 40 misaligned with passage 22. In this position the flow of fuel to engine 20 is restricted to the amount passing through peripheral groove 42, which amount is sufficient for the engine to idle. The key 84 may be removed from lock 86 in the idle position to prevent operation of the lock, and any attempt by an unauthorized user to drive the vehicle will result in the vehicle stalling within a short distance. The vehicle may run one tenth of a mile on the fuel remaining in the float chamber of its carburetor. The vehicle cannot be restarted at this time as the flow of fuel is insufficient to replace the amount used from the float chamber.

The vehicle can be restarted by inserting the key 84 in lock 86 and turning the lock to its drive position indicated at line 99. In this position the valve 36 is caused to be positioned with its transverse bore 40 aligned with passage 22, thereby providing a full flow of fuel to the engine 20. The vehicle may then be restarted, and operated in its normal and usual fashion.

Other means for rotating valve 36 in valve chamber 24 are, of course, available. For instance, the housing 11 may be mounted adjacent to the floor board of the vehicle, and a key and lock may be mounted through the floor of the vehicle to engage and rotate valve 36 without benefit of a connecting cable.

The cylindrical valve 36 may be replaced by a movable plate which would permit full flow of fuel in one orientation and a restricted flow of fuel in a second orientation. A small diameter hole through the plate may be provided for that purpose, or a small opening for bypassing the plate in its blocking orientation may be provided.

Broadly stated the invention thus comprises providing a key operated mechanism having IDLE and DRIVE positions and means for limiting operation of the vehicle to idle only when in the IDLE position. Other means consistent with the invention herein may be provided for preventing the theft of vehicles by limiting operation of the vehicle's engine to idle. These include a lock-controlled plate for greatly restricting the intake of air to the engine, or means for limiting output of the ignition system to a low number of pulses per minute. Means limiting spark advance will also suffice for this purpose.

It will thus be seen that the anti-theft device disclosed herein efficiently accomplishes the objects of this invention. A simple, durable tamper-proof device which may be easily and inexpensively installed in existing vehicles has been disclosed. A device incorporates a key controlled lock having two positions, the first of which permits a full flow of fuel allowing the vehicle to operate in its normal manner. The second position of the lock, in which the key may be removed, causes only a restricted flow of fuel to be available to the engine, so that the engine may idle, but may not be driven away by an unauthorized user.

It will thus be seen that the objects set forth above, among those made apparent from the preceding description, are efficiently attained, and since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for preventing the theft of a vehicle having an engine utilizing first and second fuel components, said engine incorporating a fuel tank for storing the first fuel component and a carburetor for mixing the first and second fuel components, said carburetor having a fuel chamber for storing a small quantity of said first fuel; comprising:
   A. a valve interposed between the fuel tank and the fuel chamber of the carburetor having:
      (a) a first position permitting full flow of said first fuel component to said chamber; and
      (b) a second position permitting restricted flow of said first fuel component to said chamber; and
   B. a lock communicating with the valve for controlling the movement of the valve between its first and second positions; whereby the engine is fully operable when the valve is placed in its first, full flow position, and is restricted to continuous idling and short time duration full loading when the valve is placed in its second, restricted flow position.

2. Apparatus for preventing the theft of a motor vehicle as defined in claim 1, wherein the first fuel component is an oxidizable fluid and the second fuel component is an oxidant.

3. Apparatus for preventing the theft of a motor vehicle as defined in claim 2, wherein said first fuel is petroleum and said second fuel is air.

4. Apparatus for preventing the theft of a motor vehicle as defined in claim 1, wherein the lock further comprises:
   (a) a first position corresponding to the first position of the valve permitting a full flow of said first fuel to the carburetor fuel chamber of said engine; and,
   (b) a second position corresponding to the second position of the valve permitting restricted flow of said first fuel to the carburetor fuel chamber of said engine, the key being removable from the lock in its second position.

5. Apparatus for preventing the theft of a motor vehicle having an engine utilizing first and second fuel components, said engine incorporating a fuel tank for storing the first fuel component and a carburetor for mixing the first and second fuel components, said carburetor having a fuel chamber for storing a small quantity of said first fuel; comprising:
   A. a valve interposed between the fuel tank and the fuel chamber of the carburetor having:
      (a) a first position permitting full flow of said first fuel component to said chamber; and
      (b) a second position permitting restricted flow of said first fuel component to said chamber;
   B. a lock communicating with the valve for controlling the movement of the valve between its first and second positions; and
   C. a shielded cable connected between said valve and said lock for remotely positioning the valve from the lock;
whereby the engine is fully operable when the valve is placed in its first, full flow position, and is restricted to continuous idling and short time duration full loading when the valve is placed in its second, restricted flow position.

6. Apparatus for preventing the theft of a vehicle having an engine utilizing first and second fuel components, said engine incorporating a fuel tank for storing the first fuel component, a carburetor for mixing the first and second fuel components, said carburetor having a fuel chamber for storing a small quantity of said first fuel, and a fuel line incorporating a first portion connected at a first end to the fuel tank and a second portion connected at a first end to the carburetor; comprising:
   A. a cylindrical valve interposed between the fuel tank and the fuel chamber of the carburetor having:
      (a) a first position permitting full flow of said first fuel component to said chamber; and
      (b) a second position permitting restricted flow of said first fuel component to said chamber; wherein said valve has a bore therethrough alignable with the fuel line to provide a full flow of fuel to the engine in its first position, and having a peripheral reduced diameter portion intersecting the fuel line to provide a restricted flow of fuel to the engine in its second position;
   B. a lock communicating with the valve for controlling the movement of the valve between its first and second position; and
   C. a housing installed between the second ends of the first and second portions of said fuel line, incorporating:
      (a) an inlet port connected to the second end of the first portion of said fuel line,
      (b) an outlet port connected to the second end of the second portion of said fuel line, and
      (c) a cylindrical valve chamber conforming to said cylindrical valve to rotatably receive said valve;
whereby the engine is fully operable when the valve is placed in its first, full flow position, and is restricted to continuous idling and short time duration full loading when the valve is placed in its second, restricted flow position.

7. Apparatus for preventing the theft of a motor vehicle having an engine utilizing first and second fuel components, said engine incorporating a fuel tank for storing the first fuel component and a carburetor for mixing the first and second fuel components, said carburetor having a fuel chamber for storing a small quantity of said fuel and a fuel line incorporating a first portion connected at a first end to the fuel tank and a second portion connected at a first end to the carburetor; comprising:

A. a cylindrical valve interposed between the fuel tank and the fuel chamber of the carburetor having:
   (a) a first position permitting full flow of said first fuel component to said chamber; and
   (b) a second position permitting restricted flow of said first fuel component to said chamber, said valve having a first bore therethrough alignable with the fuel line to provide a full flow of fuel to the engine in its first position and having a second smaller bore therethrough alignable with the fuel line to provide a restricted flow of fuel to the chamber in its second position;
B. a lock communicating with the valve controlling the movement of the valve between its first and second positions; and
C. a housing installed between the second ends of the first and second portions of said fuel line incorporating:
   (a) an inlet port connected to the second end of the first portion of said fuel line,
   (b) an outlet port connected to the second end of the second portion of said fuel line, and
   (c) a cylindrical valve chamber conforming to said cylindrical valve so as to rotatably receive said valve;

whereby the engine is fully operable when the valve is placed in its first, full flow position, and is restricted to continuous idling and short time duration full loading when the valve is placed in its second, restricted flow position.

8. Apparatus for preventing the theft of a vehicle as defined in claim 1 wherein said vehicle further comprises a fuel line incorporating a first portion connected at a first end to the fuel tank and a second portion connected at a first end to the carburetor, further comprising:

C. a housing installed between the second ends of the first and second portions of said fuel line, incorporating:
   1. an inlet port connected to the second end of the first portion of said fuel line,
   2. an outlet port connected to the second end of the second portion of said fuel line, and
   3. a valve chamber within the housing dimensioned to rotatably receive said valve.

9. Apparatus for preventing the theft of a motor vehicle having an engine utilizing first and second fuel components, said engine incorporating a fuel tank for storing the first fuel component and a fuel supplier for mixing the first and second fuel components, said fuel supplier having a fuel chamber for storing a small quantity of said first fuel, comprising:

A. means interposed between the fuel tank and the fuel chamber of the fuel supplier having:
   (a) a first position permitting full flow of said first fuel component to said chamber; and
   (b) a second position permitting restricted flow of said first fuel component to said chamber; thereby permitting small time intervals of increased engine speed; and
B. a lock communicating with said means for controlling the movement of said means between its first and second positions;

whereby the engine is fully operable when the means is placed in its first, full flow position, and is restricted to continuous idling and short time duration increased engine speed when the means is placed in its second, restricted flow position.

* * * * *